United States Patent [19]

Hsu et al.

[11] Patent Number: 4,490,396

[45] Date of Patent: * Dec. 25, 1984

[54] PREPARATION OF A FLAVORED SOLID VEGETABLE AND VEGETABLE JUICE UTILIZING HYDROLYSED PROTEIN

[75] Inventors: Jau Y. Hsu; Elaine R. Wedral, both of Brookfield, Conn.; William J. Klinker, Blue Island, Ill.

[73] Assignee: Societe d'Assistance Technique pour Produits Nestle S. A., Lausanne, Switzerland

[*] Notice: The portion of the term of this patent subsequent to Sep. 8, 1999 has been disclaimed.

[21] Appl. No.: 538,792

[22] Filed: Oct. 4, 1983

Related U.S. Application Data

[63] Continuation-in-part of Ser. No. 435,074, Oct. 18, 1982, Pat. No. 4,428,968.

[51] Int. Cl.³ .............................................. A23L 1/218
[52] U.S. Cl. .......................................... 426/49; 426/8; 426/51; 426/650
[58] Field of Search ................. 426/49, 51, 52, 8, 481, 426/533, 615, 650

[56] References Cited

U.S. PATENT DOCUMENTS 3,840,674 10/1974 Mosher .............................. 426/533
4,242,361 12/1980 Christ et al. .......................... 426/49

OTHER PUBLICATIONS

Desrosier, N. W. Elements of Food Technology; 1977 Avi Publ. Co. pp. 246–250.
Lopez, A., A Complete Course in Canning, 1970, The Canning Trade, Inc., pp. 241–246.

Primary Examiner—Robert Yoncoskie
Assistant Examiner—Marianne S. Minnick
Attorney, Agent, or Firm—Vogt & O'Donnell

[57] ABSTRACT

A process for the production of flavored vegetables which comprises fermenting a vegetable in the presence of a powdered hydrolysed protein wherein the total amount of salt present in the process is from 1.0% to 4.5% by weight based on the weight of the vegetable.

3 Claims, No Drawings

PREPARATION OF A FLAVORED SOLID VEGETABLE AND VEGETABLE JUICE UTILIZING HYDROLYSED PROTEIN

REFERENCE TO RELATED APPLICATIONS

This application is a continuation-in-part of U.S. application Ser. No. 435,074, filed Oct. 18, 1982 U.S. Pat. No. 4,428,968.

The present invention relates to the production of flavoured fermented vegetables, particularly to fermented vegetables having meat flavour characteristics.

Sauerkraut which has been flavoured by spices such as caraway seed has been known for a long time. However, up to the present time, sauerkraut having meat flavour characteristics has not been produced. Considering that sauerkraut is usually consumed with meat, it would be very desirable to develop a meaty flavoured sauerkraut.

In the fermentation of vegetables, salt is normally used to withdraw water and nutrients from the vegetable tissue. The nutrients furnish the substrate for the growth of lactic acid bacteria. Acids are produced during the fermentation process and the combination of the acids produced during fermentation inhibits the growth of undesirable bacteria and delays enzymatic softening of the vegetables. It is also known that during lactic acid fermentation of vegetables, lowering the pH or increasing the acidity at the beginning of the process inhibits the growth of some microorganisms and promotes the growth of acid tolerant bacteria such as lactic acid bacteria.

We have now surprisingly found that by substituting powdered hydrolysed plant protein, either completely or partially, for the salt which is normally used during the fermentation of vegetables, a meaty flavoured vegetable is produced, the growth of lactic acid bacteria is promoted and the production of lactic acid is increased without the necessity of lowering the pH or increasing the acidity at the beginning of the process.

Accordingly, the present invention provides a process for the production of flavoured vegetables which comprises fermenting a vegetable in the presence of a powdered hydrolysed protein wherein the total amount of salt present in the process is from 1.0% to 4.5% by weight based on the weight of the vegetable.

The fermented vegetable may be any vegetable preserved by lactic acid fermentation alone or in combination with any other fermentation treatment, for example, fermented vegetables prepared from cabbage, cucumber, green tomato, red pepper, mustard stem, mustard green, radish, turnip, squash or green beans.

The total amount of salt present in the fermentation process is conveniently from 1.5% to 4.0% by weight, preferably 1.75% to 3.75% by weight and especially from 2.0% to 3.6% by weight based on the weight of the vegetable.

Powdered hydrolysed protein usually contains from 30% to 50% by weight of salt based on the weight of the protein and, if desired, all the salt that is present in the process may be contained wholly within the protein. Alternatively some salt may be added separately in addition to that contained in the powdered hydrolysed protein so that the desired amount of salt is present in the fermentation process.

The amount of powdered hydrolysed protein present in the fermentation process may be from 0.5% to 15% by weight, preferably from 0.75% to 12% by weight and especially from 1% to 10% by weight based on the weight of the vegetable.

The hydrolysed protein may be of plant or animal origin and maybe a chemically or enzymatically, hydrolysed protein. For example, the hydrolysed protein may be a chemical hydrolysate prepared from a plant or animal source, an autolysed yeast extract from brewer's or baker's yeast, soy sauce from enzymatically degraded soy sauce or soy and wheat mixtures, or meat flavours based on hydrolysed proteins reacting with other ingredients such as reducing sugars, thiamine or cysteine.

The use of hydrolysed protein or a mixture of hydrolysed protein and salt for the fermentation of vegetable produces an acidity equal to or higher than when salt alone is used even allowing for the fact that hydrolysed protein itself contains acids (levulinic and formic acids in chemically hydrolysed proteins and lactic acid in enzymatically hydrolysed proteins). This can be demonstrated by subtracting the initial acidity (of the acids which already exist in the hydrolysed protein) from the final acidity.

The fermentation process is conveniently carried out by thoroughly mixing the vegetable, preferably in shredded form, with the hydrolysed protein and then pressing in a tank for a few weeks, suitably 3 to 6 weeks, at a temperature from 15° C. to 25° C.

By the fermentation process, solid vegetable and vegetable juice are obtained and, if desired, each may be pasteurised and canned separately. Accordingly, the present invention also provides solid fermented vegetable or fermented vegetable juice whenever prepared by the process of this invention.

Optionally, the vegetable juice may be mixed with further hydrolysed protein to produce a flavoured seasoning product. The present invention, therefore, also provides a mixture of hydrolysed protein and vegetable juice prepared by the process of the present invention. The mixture of vegetable juice and hydrolysed protein may contain from 25% to 45% by weight and preferably from 30% to 40% by weight of hydrolysed protein based on the weight of the mixture.

The fermented vegetables produced by the process of this invention have a meaty flavour. In addition, the hydrolysed proteins in the fermented vegetables produced by the process of the present invention have a more natural, fermented flavour characteristic owing to the presence of lactic acid, ethanol and esters produced during the fermentation. The flavour of the hydrolysed protein is thus improved, and this is especially marked in chemically hydrolysed proteins.

The following Examples further illustrate the present invention in which parts and percentages are given by weight.

EXAMPLE 1

95 parts of fresh shredded cabbage at 18° C. were mixed with 5 parts of chicken flavoured chemically hydrolysed plant protein containing 45% salt. The salt contributed by the hydrolysed protein is thus 2.25 parts. The hydrolysed protein and shredded cabbage weighing 110 kilograms was mixed well and the cabbage was tightly packed in a tank. The cabbage was covered with layers of plastic liner which were covered with water containing 2% salt on a weight/weight basis. The volume of water used was one third of the volume of the tank. The tank was stored at 20°–23° C. for 4 weeks.

Juice samples were collected before and after the fermentation period and their pH and acidity levels were analysed. The pH fell from 5.10 to 3.86 while the acidity increased from 0.60% to 2.33%. The sauerkraut had a chicken type flavour characteristic and had a texture similar to that obtained by normal fermentation using salt. The sauerkraut was afterwards pasteurised and canned.

COMPARATIVE EXAMPLE

A similar procedure to that described in Example 1 was followed except that 97.75 parts of fresh shredded cabbage were mixed with 2.25 parts of salt and fermented in the absence of any hydrolysed protein. The sauerkraut did not have a meaty flavour and the pH fell from 6.60 to 3.44 while the acidity increased from 0.07% to 1.70%. The increase in acidity of 1.63 is therefore not as great as that during fermentation using hydrolysed plant protein in Example 1 which is 1.73.

EXAMPLE 2

96 parts of fresh shredded cabbage at 18° C., 2.8 parts of chicken flavoured chemically hydrolysed plant protein containing 45% salt and 1.2 parts salt were mixed and treated in a similar manner to that described in Example 1. After fermentation, the sauerkraut had a chicken flavour, an acidity of 1.82% and a pH of 3.81.

EXAMPLE 3

A similar procedure to that described in Example 1 was followed but using 93.9 parts cabbage and 6.1 parts of a beef flavoured hydrolysed plant protein containing 37% salt. The pH of the sauerkraut was 3.86 and the acidity increased from 0.67% to 2.70%. The sauerkraut had a beef flavour characteristic.

EXAMPLE 4

A similar procedure to that described in Example 1 was followed but using only 2.6 parts of the chicken flavoured chemically hydrolysed protein containing 45% salt with 97.4 parts of shredded fresh cabbage. The sauerkraut had a chicken flavour, an acidity of 2.32% and a pH of 3.88.

EXAMPLE 5

A similar procedure to that described in Example 1 was followed but using 7.2 parts of the chicken flavoured chemically hydrolysed protein containing 45% salt and 92.8 parts of cabbage. The sauerkraut had a chicken flavour, an acidity of 2.0% and a pH of 3.96 and the texture was even firmer than that of Example 1.

EXAMPLE 6

A similar procedure to that described in Example 1 was followed wherein the flavoured sauerkraut juice obtained was pasteurised and canned. The juice had a natural chicken flavour characteristic and is suitable for use in cooking.

EXAMPLE 7

A similar procedure to that described in Example 3 was followed wherein the flavoured sauerkraut juice obtained was pasteurised and canned. The juice had a natural beef flavour characteristic and is suitable for use in cooking.

EXAMPLE 8

A similar procedure to that described in Example 1 was followed wherein 64 parts of the sauerkraut juice obtained was mixed with a further 36 parts of the chicken flavoured chemically hydrolysed plant protein containing 45% salt to produce a chicken flavoured seasoning product.

EXAMPLE 9

A similar procedure to that described in Example 3 was followed wherein 58 parts of the sauerkraut juice obtained was mixed with a further 42 parts of a beef flavoured hydrolysed plant protein containing 37% salt to produce a beef flavoured seasoning product.

We claim:

1. A process for the production of a flavoured solid vegetable and vegetable juice which comprises fermenting a vegetable in the presence of salt in an amount of from 1.0% to 4.5% by weight based on the weight of the vegetable and a powdered hydrolysed protein in an amount of from 1% to 10% by weight based on the weight of the vegetable.

2. The process of claim 1, wherein the total amount of salt present in the fermentation process is from 1.75% to 3.75% by weight based on the weight of the vegetable.

3. The process of claim 1, wherein the vegetable juice obtained is separated from the fermented vegetable and further mixed with hydrolysed protein to produce a flavoured seasoning product.

* * * * *

UNITED STATES PATENT AND TRADEMARK OFFICE
CERTIFICATE OF CORRECTION

PATENT NO. : 4,490,396
DATED : December 25, 1984
INVENTOR(S) : Jau Y. Hsu, et al.

It is certified that error appears in the above—identified patent and that said Letters Patent is hereby corrected as shown below:

At the Title Page, under the subheading "Notice:", the sentence "The portion of the term of this patent subsequent to Sep. 8, 1999 has been disclaimed." should read --The portion of the term of this patent subsequent to Jan. 31, 2001 has been disclaimed.--

Signed and Sealed this

Twenty-third Day of April 1985

[SEAL]

Attest:

DONALD J. QUIGG

*Attesting Officer*    *Acting Commissioner of Patents and Trademarks*